US009828021B2

(12) United States Patent
Ueno et al.

(10) Patent No.: US 9,828,021 B2
(45) Date of Patent: Nov. 28, 2017

(54) POWER STEERING APPARATUS

(71) Applicant: Showa Corporation, Gyoda-shi (JP)

(72) Inventors: Takayuki Ueno, Haga-gun (JP);
Masaru Ishiwata, Haga-gun (JP)

(73) Assignee: SHOWA CORPORATION, Gyoda-Shi (JP)

( * ) Notice: Subject to any disclaimer, the term of this patent is extended or adjusted under 35 U.S.C. 154(b) by 72 days.

(21) Appl. No.: 15/078,169

(22) Filed: Mar. 23, 2016

(65) Prior Publication Data

US 2016/0280253 A1    Sep. 29, 2016

(30) Foreign Application Priority Data

Mar. 24, 2015   (JP) ................... 2015-061335

(51) Int. Cl.
| | |
|---|---|
| *B62D 5/04* | (2006.01) |
| *B62D 15/02* | (2006.01) |
| *B62D 3/12* | (2006.01) |

(52) U.S. Cl.
CPC .......... *B62D 5/0421* (2013.01); *B62D 3/12* (2013.01); *B62D 5/0481* (2013.01); *B62D 15/0225* (2013.01)

(58) Field of Classification Search
CPC ................. B62D 3/12; B62D 5/0409
See application file for complete search history.

(56) References Cited

U.S. PATENT DOCUMENTS

| | | | | |
|---|---|---|---|---|
| 8,775,025 | B2* | 7/2014 | Yamaguchi | B62D 5/008 180/446 |
| 9,227,653 | B2* | 1/2016 | Kita | B62D 3/126 |
| 9,376,107 | B2* | 6/2016 | Suzuki | B60T 8/1755 |
| 2006/0076181 | A1* | 4/2006 | Murakami | B62D 5/0424 180/443 |
| 2014/0208890 | A1 | 7/2014 | Takayanagi et al. | |

FOREIGN PATENT DOCUMENTS

| | | |
|---|---|---|
| EP | 2159134 A | 3/2010 |
| EP | 2792574 A | 10/2014 |
| JP | 2006-322794 A | 11/2006 |

OTHER PUBLICATIONS

Extended European Search Report dated Aug. 9, 2016 for the corresponding European Patent Application 16162124.8.

* cited by examiner

*Primary Examiner* — Kevin Hurley

(74) *Attorney, Agent, or Firm* — Leason Ellis LLP

(57) ABSTRACT

Disclosed is a power steering apparatus including: a rack shaft that includes a rack, and moves front wheels; a steering wheel-side pinion shaft that includes a pinion meshing with steering wheel-side rack teeth of the rack shaft, and is rotated along with the steering of a steering wheel; an assistance unit-side pinion shaft that includes a pinion meshing with an assistance unit-side rack of the rack shaft, and is driven by an electric motor to rotate so as to assist the rotation of the steering wheel-side pinion shaft; and a steering angle sensor that is provided on the assistance unit-side pinion shaft, and detects a rotational angle of the assistance unit-side pinion shaft.

20 Claims, 5 Drawing Sheets

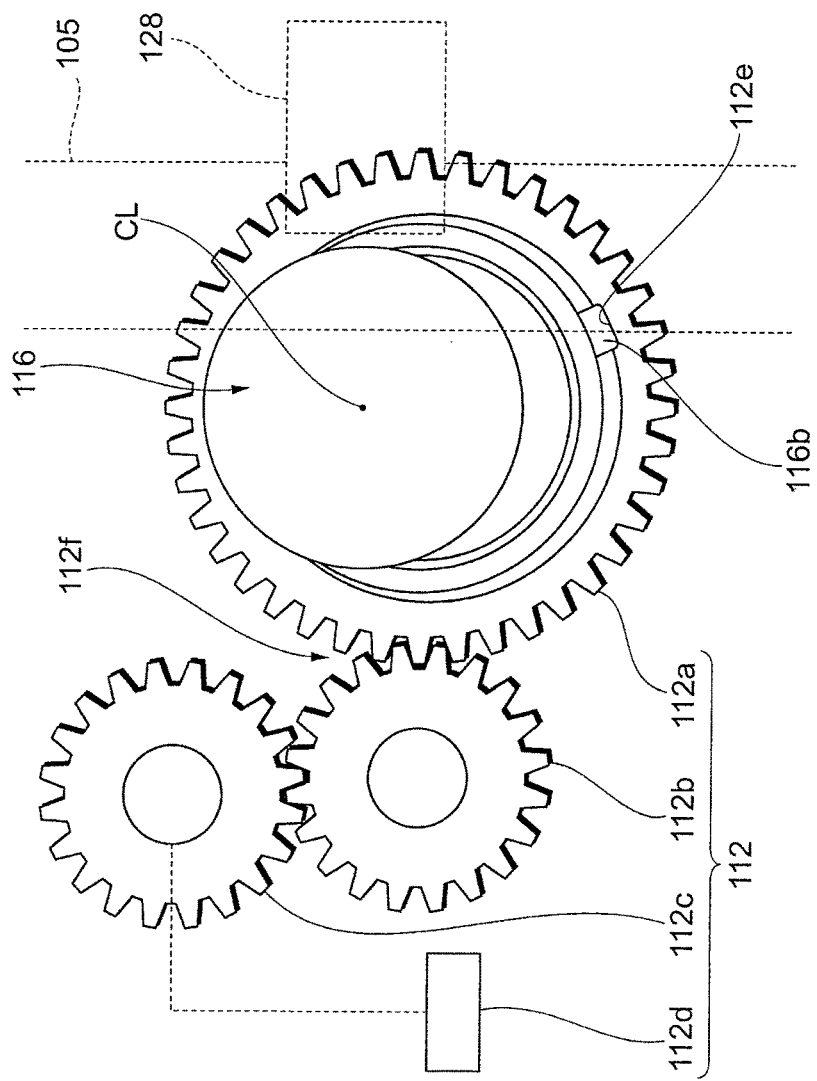

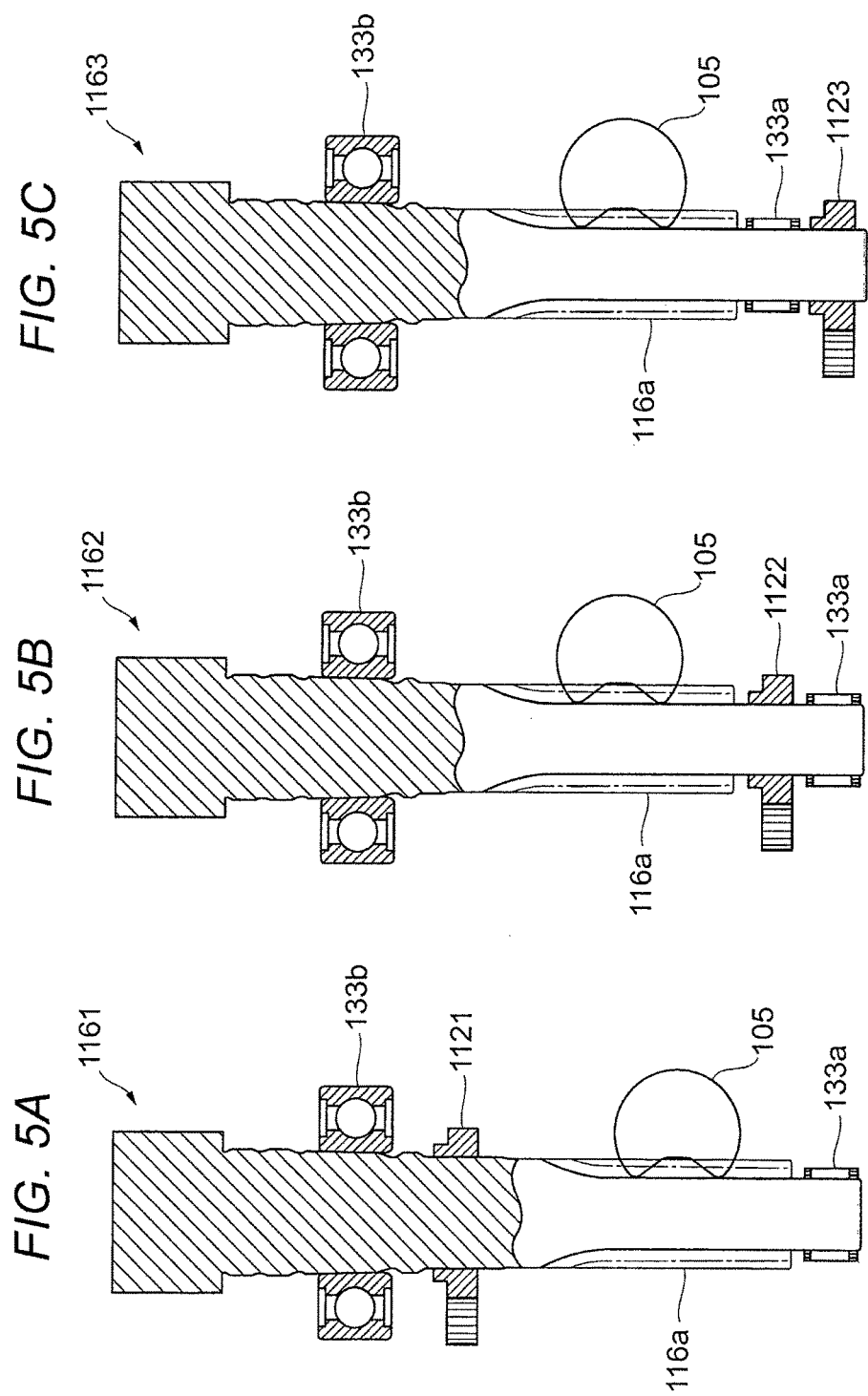

POWER STEERING APPARATUS

CROSS-REFERENCE TO RELATED APPLICATIONS

This application claims the benefit of Japanese Patent Application JP 2015-061335, filed Mar. 24, 2015, the entire content of which is hereby incorporated by reference, the same as if set forth at length.

BACKGROUND OF THE INVENTION

1. Field of the Invention

The present invention relates to a power steering apparatus.

2. Description of Related Art

In recent years, vehicle intelligence has progressed, and a vehicle, in which drive control for traveling is adjusted according to the steering angle of a steering wheel is adopted. In such a vehicle, a steering angle sensor (angle sensor) is provided to detect the rotational angle of the steering wheel.

JP-A-2006-322794 proposes technology in which the rotational angle of a steering shaft is detected by an absolute steering angle sensor provided on an input shaft of the steering shaft of a vehicle.

SUMMARY OF THE INVENTION

When an angle sensor is provided on a steering shaft connected to a steering wheel (steering unit), friction induced by configuration members of the angle sensor may affect steering feeling when a driver operates the steering unit.

An object of the present invention is to suppress deterioration of steering feeling by providing an angle sensor.

According to an aspect of the present invention, there is provided a power steering apparatus including: a rack shaft that includes a rack, and moves a steered unit; a first pinion shaft that includes a first pinion meshing with the rack of the rack shaft, and is rotated along with steering of a steering unit; a second pinion shaft that includes a second pinion meshing with the rack of the rack shaft, and is driven by a drive unit to rotate so as to assist the rotation of the first pinion shaft; and an angle sensor that is provided on the second pinion shaft, and detects a rotational angle of the second pinion shaft.

In the aspect, the angle sensor may be provided at a portion of the second pinion shaft, which is opposite to the second pinion in an axial direction of the second pinion shaft while a driven portion of the second pinion shaft which receives a driving force by the drive unit is interposed between the angle sensor and the second pinion.

In the aspect, the second pinion shaft may be supported by a first bearing and a second bearing which are respectively provided at both sides of the second pinion shaft so that a driven portion of the second pinion shaft which receives a driving force by the drive unit is positioned between the first bearing and the second bearing in an axial direction of the second pinion shaft. The angle sensor may be provided between the first bearing and the second bearing in the axial direction of the second pinion shaft.

In the aspect, the angle sensor may be provided at same side of the second pinion shaft as the second pinion, with respect to a driven portion of the second pinion shaft which receives a driving force by the drive unit, in an axial direction of the second pinion shaft.

In the aspect, the power steering apparatus may further include a housing that includes a body accommodating the second pinion shaft and having an opening at a side of an end portion of the second pinion shaft opposite to the second pinion of the second pinion shaft, and a covering member covering the opening of the body.

In the aspect, a sensor detecting a rotational angle of the steering unit may not be provided between the steering unit and the first pinion.

In the aspect, the angle sensor may include a gear rotating together with the second pinion, and a detection unit meshing with the gear and detecting the rotation of the gear.

According to another aspect of the present invention, there is provided a power steering apparatus including: a rack shaft that includes a rack, and moves a steered unit; a first pinion shaft that includes a first pinion meshing with the rack of the rack shaft, and is rotated along with steering of a steering unit; a second pinion shaft that includes a second pinion meshing with the rack of the rack shaft, and a driven portion of the second pinion shaft which receives a driving force by a drive unit; a rotator that is provided at a portion of the second pinion shaft, which is opposite to the second pinion, with the driven portion interposed between the rotator and the second pinion, and is rotated together with the second pinion shaft; and a detector that is rotated meshing with the rotator, and detects a rotational angle of the rotator.

According to the present invention, it is possible to suppress deterioration of steering feeling by providing an angle sensor.

BRIEF DESCRIPTION OF THE DRAWINGS

FIG. 4 is a configuration view illustrating the configuration of a steering angle sensor.

FIGS. 5A to 5C are views illustrating modification examples of the mounting position of the steering angle sensor.

DESCRIPTION OF EMBODIMENTS

Hereinafter, an embodiment of the present invention will be described in detail with reference to the accompanying drawings.

Schematic Configuration of Motor-Driven Power Steering Apparatus 1

Figure 1:
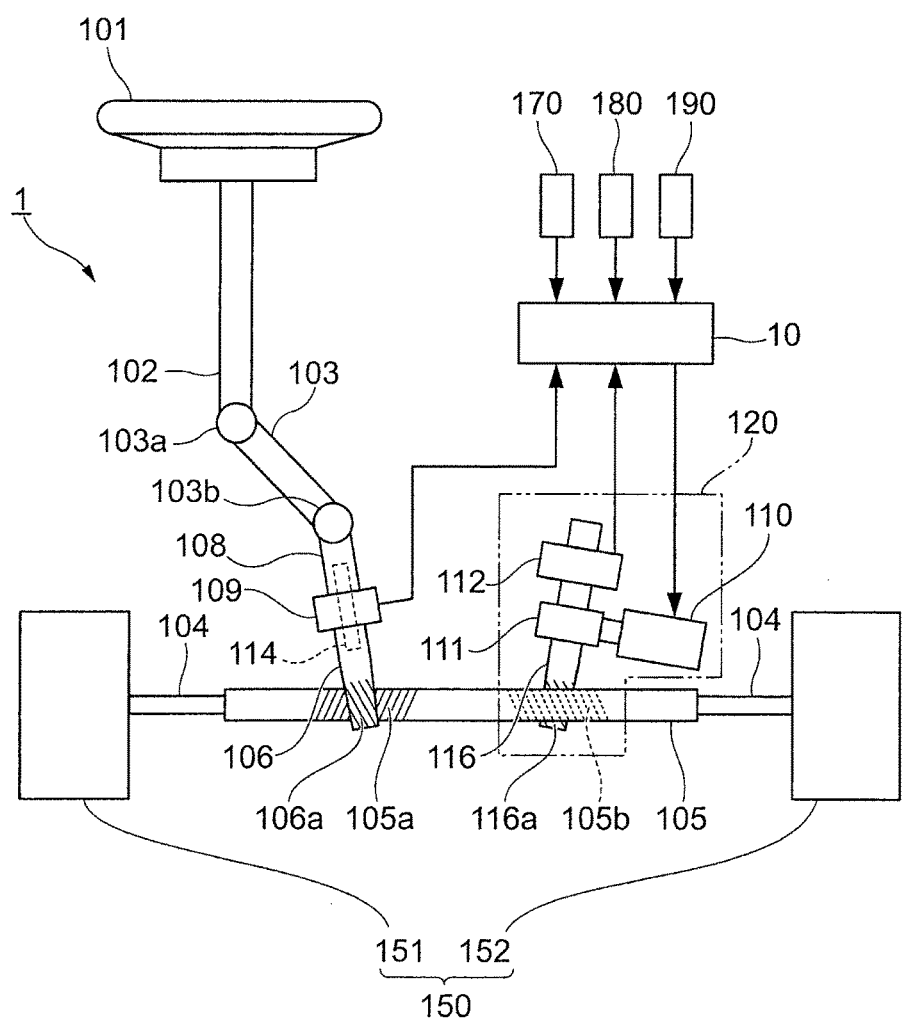
FIG. 1 is a schematic view illustrating the configuration of a motor-driven power steering apparatus in an embodiment.

FIG. 1 is a schematic view illustrating the configuration of a motor-driven power steering apparatus 1 in an embodiment.

The motor-driven power steering apparatus 1 illustrated in FIG. 1 is a steering apparatus for changing a forward-moving direction of a vehicle to an arbitrary direction. The embodiment exemplarily describes the configuration of the motor-driven power steering apparatus 1 applied to an automobile. The motor-driven power steering apparatus 1 in the embodiment is a so-called double pinion type (dual pinion type) power steering apparatus.

Specifically, the motor-driven power steering apparatus 1 includes a wheel-shaped steering wheel (steering unit) 101 operated by a driver to change the forward-moving direction of the automobile, and a steering shaft 102 provided integrally with the steering wheel 101. The steering apparatus 1 includes an upper connecting shaft 103 connected to the steering shaft 102 via a universal coupling 103a, and a lower connecting shaft 108 connected to the upper connecting shaft 103 via a universal coupling 103b. The lower connecting shaft 108 is rotated along with the rotation of the steering wheel 101.

The motor-driven power steering apparatus 1 includes tie rods 104 respectively connected to front wheels (steered units) 150 as turning wheels including a right front wheel 151 which is a front wheel on the right (left side in FIG. 1) when seen from a driver's side, and a left front wheel 152 which is a front wheel on the left side (right side in FIG. 1), and a rack shaft 105 connected to the tie rods 104. The rack shaft 105 includes steering wheel-side rack teeth 105a, an example of a rack, and assistance unit-side rack 105b which are disposed at different positions in an axial direction of the rack shaft 105.

The motor-driven power steering apparatus 1 includes a steering wheel-side pinion shaft (first pinion shaft) 106 provided with a pinion (first pinion) 106a that forms a rack and pinion mechanism together with the steering wheel-side rack teeth 105a of the rack shaft 105. In the motor-driven power steering apparatus 1, the lower connecting shaft 108 is connected to the steering wheel-side pinion shaft 106 via a torsion bar 114.

The motor-driven power steering apparatus 1 further includes a torque sensor 109 detecting a relative angle between the lower connecting shaft 108 and the steering wheel-side pinion shaft 106, in other words, detecting the steering torque of the steering wheel 101 based on the amount of twist of the torsion bar 114. It can be considered that the torsion bar 114 is a member which is more prone to twisting than an assistance unit-side pinion shaft 116.

The motor-driven power steering apparatus 1 includes an assistance unit 120 applying steering assistance force to the rack shaft 105. The assistance unit 120 includes a steering angle sensor 112 that detects the steering angle of the steering wheel 101 by detecting the rotational angle of the assistance unit-side pinion shaft 116 (to be described later). The specific configuration of each of the assistance unit 120 and the steering angle sensor 112 of the assistance unit 120 will be described later.

The motor-driven power steering apparatus 1 includes a control apparatus 10 controlling the operation of an electric motor 110. The control apparatus 10 receives output signals from the torque sensor 109 and the steering angle sensor 112.

The control apparatus 10 in the illustrated example receives output signals from a vehicle speed sensor 170 detecting a vehicle speed which is the moving speed of the automobile; a tire pressure sensor 180 detecting tire pressure which is the pressure of each of the front wheels 150; a yaw rate sensor 190 detecting the yaw rate (changing speed of a turning angle in a turning direction) of the automobile; and the like via a network (CAN) by which signals for controlling various devices mounted in the automobile are communicated. For example, the control apparatus 10 is an electronic control unit (ECU).

Specific Configuration of the Motor-Driven Power Steering Apparatus 1

Figure 2:
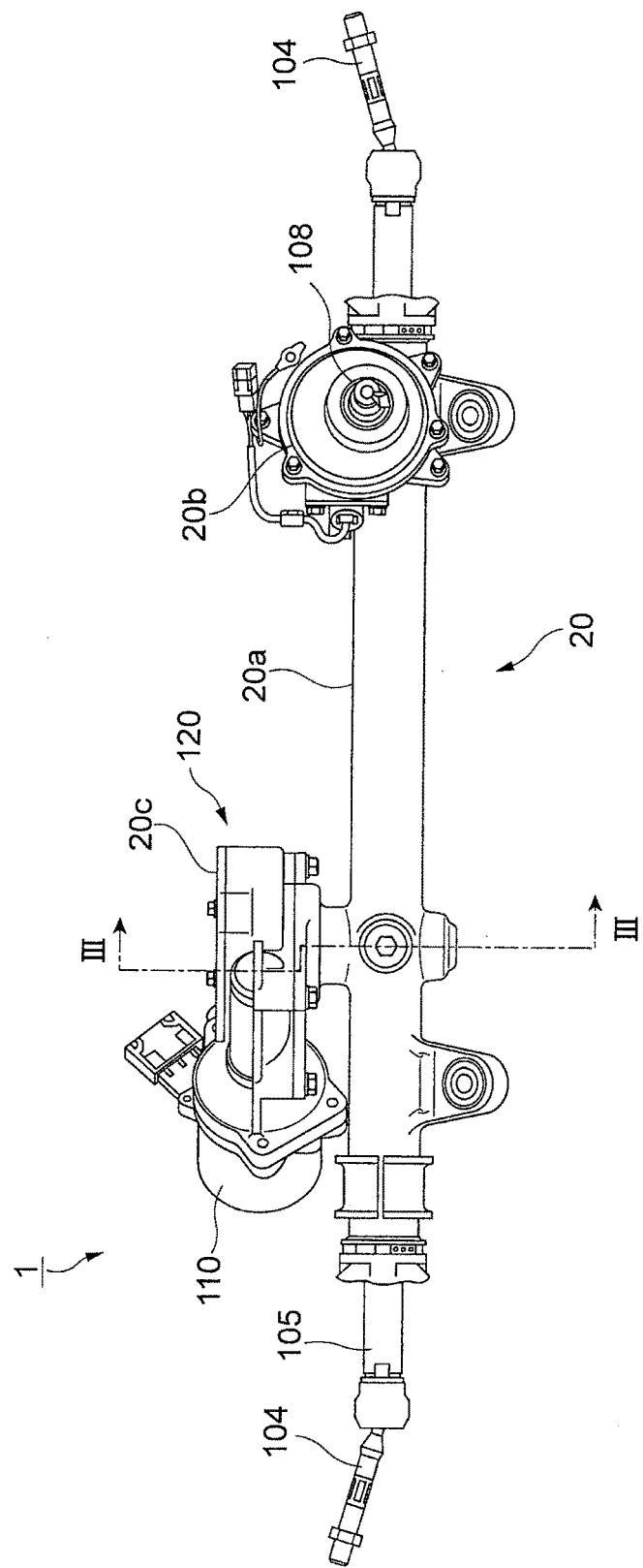
FIG. 2 is a schematic top view of the motor-driven power steering apparatus in the embodiment.

FIG. 2 is a schematic top view of the motor-driven power steering apparatus 1 in the embodiment.

In the following description, a longitudinal direction of the rack shaft 105 may be simply referred to as a longitudinal direction, and a circumferential direction around a center axis of the rack shaft 105 may be simply referred to as a circumferential direction.

As illustrated in FIG. 2, the motor-driven power steering apparatus 1 includes a housing 20 (which has not been described above) accommodating various items of the aforementioned members. The housing 20 includes a rack shaft accommodating portion 20a accommodating the rack shaft 105; a steering wheel-side accommodating portion 20b accommodating the steering wheel-side pinion shaft 106 and the like; and an assistance unit-side accommodating portion 20c accommodating the assistance unit 120.

The steering wheel-side accommodating portion 20b and the assistance unit-side accommodating portion 20c are provided at different positions in the longitudinal direction. The steering wheel-side accommodating portion 20b and the assistance unit-side accommodating portion 20c are disposed in different directions (angles) in which the steering wheel-side accommodating portion 20b and the assistance unit-side accommodating portion 20c have different angles with respect to the center axis of the rack shaft 105. In other words, the steering wheel-side accommodating portion 20b and the assistance unit-side accommodating portion 20c are disposed at different positions in the circumferential direction.

Assistance Unit 120

Figure 3:
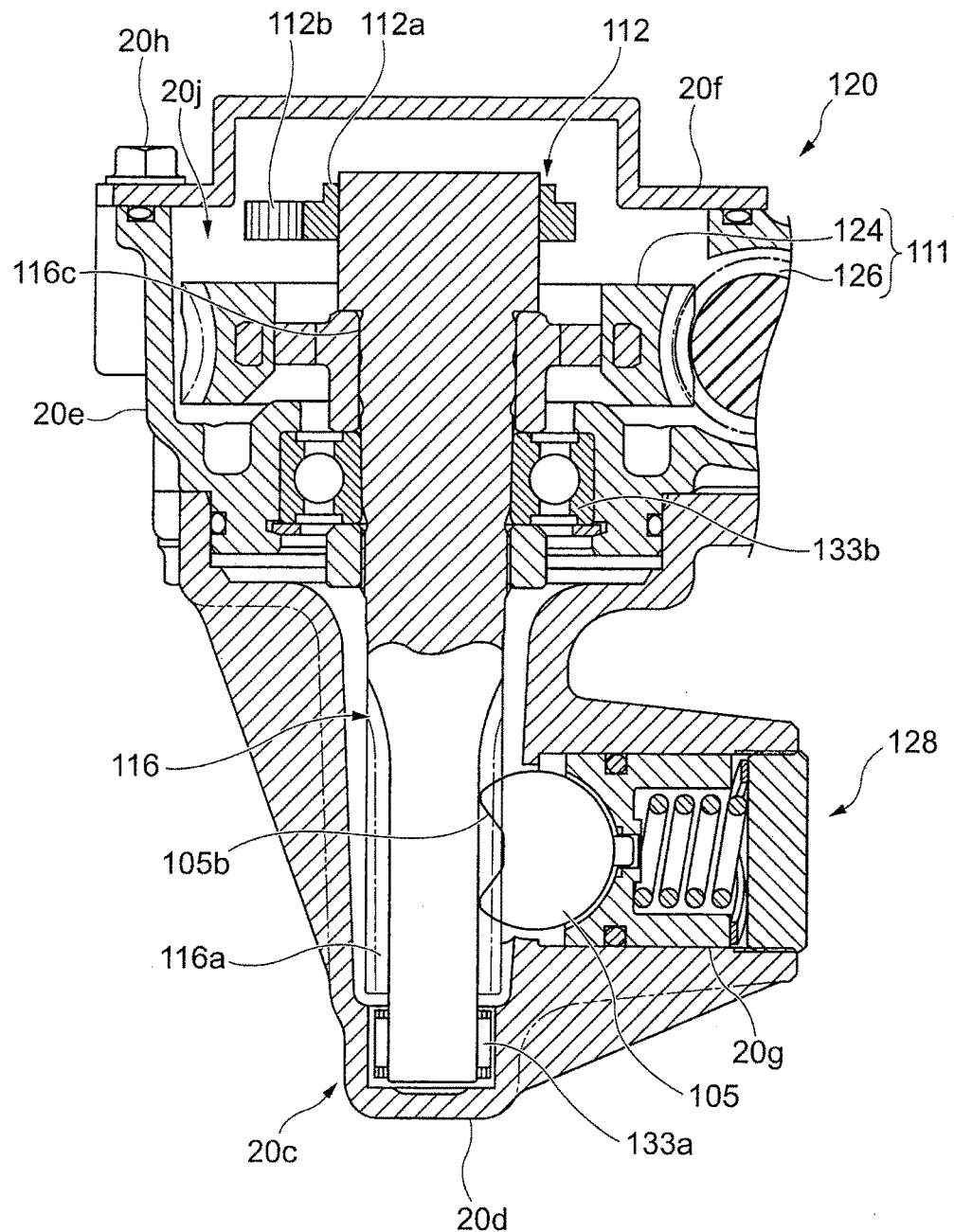
FIG. 3 is a sectional view illustrating an assistance unit in the embodiment.

FIG. 3 is a sectional view illustrating the assistance unit 120 in the embodiment, and is a sectional view taken along line III-III in FIG. 2.

As illustrated in FIG. 3, the assistance unit 120 includes the assistance unit-side pinion shaft (second pinion shaft) 116 provided with a pinion (second pinion) 116a that forms a rack and pinion mechanism together with the assistance unit-side rack 105b of the rack shaft 105.

The assistance unit 120 includes the electric motor 110 (refer to FIG. 2), and a speed reduction mechanism 111 that reduces driving force of the electric motor 110, and transmits the resultant force to the assistance unit-side pinion shaft 116. The speed reduction mechanism 111 illustrated includes a worm wheel 124 fixed to the assistance unit-side pinion shaft 116, and a worm gear 126 connected to an output shaft of the electric motor 110. The assistance unit 120 includes a rack guide 128 that guides the movement of the rack shaft 105 meshing with (being engaged with) the assistance unit-side pinion shaft 116.

In the illustrated example, the assistance unit-side accommodating portion 20c accommodating the assistance unit 120 includes a first member 20d; a second member 20e; and a third member (covering member) 20f. The first member 20d and the second member 20e are members, each of which has a tubular space therein.

The first member 20d forms a space accommodating a connection portion (meshing portion) between the assistance unit-side pinion shaft 116 and the rack shaft 105. The second member 20e forms a space accommodating the worm wheel 124, and includes an opening end portion that is opposite to the pinion 116a in an axial direction of the assistance unit-side pinion shaft 116.

The third member 20f is a substantially circular plate-like member, and is provided to cover an opening portion 20j of the second member 20e. The third member 20f illustrated is fixed to the second member 20e via fixing members (bolts) 20h.

The assistance unit-side pinion shaft 116 is a substantially circular plate-like single member. The assistance unit-side pinion shaft 116 mounted in the vehicle is disposed to intersect with a perpendicular direction. In the embodiment, the assistance unit-side pinion shaft 116 is transversely and substantially horizontally disposed along a forward and rearward direction of the vehicle (refer to FIG. 2).

At least one of the pinion 116a of the assistance unit-side pinion shaft 116 and the assistance unit-side rack 105b of the rack shaft 105 is a helical gear, the thread helixes of which are diagonal with respect to the center axis thereof.

A first end side (lower end side in FIG. 3) of the assistance unit-side pinion shaft 116 in the axial direction of the assistance unit-side pinion shaft 116 is rotatably held by a first bearing 133a, and a center portion of the assistance unit-side pinion shaft 116 in the axial direction is held by a second bearing 133b. Additionally, a second end side (upper end side in FIG. 3) of the assistance unit-side pinion shaft 116 in the axial direction is not supported by bearings such as the first bearing 133a and the second bearing 133b.

The worm wheel 124 is provided on the second end side (upper end side in FIG. 3) of the assistance unit-side pinion shaft 116 in the axial direction, which is opposite to the side on which the pinion 116a is formed in the assistance unit-side pinion shaft 116. The rotation axis of the worm wheel 124 is disposed coaxially to the assistance unit-side pinion shaft 116. The worm wheel 124 meshes with the worm gear 126 of the electric motor 110 (refer to FIG. 2).

The worm wheel 124 receives rotation driving force from the electric motor 110 (refer to FIG. 2) via the worm gear 126, and thus is rotated together with the assistance unit-side pinion shaft 116. A mounting portion 116c (on which the worm wheel 124 is mounted) of the assistance unit-side pinion shaft 116 is an example of a driven portion driven by the electric motor (drive unit) 110.

The rack guide 128 is inserted into a cylinder portion 20g of the first member 20d. The rack guide 128 pushes the assistance unit-side rack 105b of the rack shaft 105 against the pinion 116a of the assistance unit-side pinion shaft 116, and slidably supports the rack shaft 105.

The assistance unit 120 with the aforementioned configuration is controlled by the control apparatus 10 (refer to FIG. 1) to assist steering force applied to the steering wheel 101 by a driver.

Specifically, the electric motor 110 is driven according to the steering torque of the steering wheel 101 detected by the torque sensor 109 (refer to FIG. 1). The driving force (generated torque) of the electric motor 110 (refer to FIG. 1) is transmitted to the steering wheel 101 (refer to FIG. 1) via the rack shaft 105 and the like while rotating the assistance unit-side pinion shaft 116. That is, torque generated by the electric motor 110 assists the steering torque applied to the steering wheel 101 by the driver.

Steering Angle Sensor 112

FIG. 4 is a view illustrating the configuration of the steering angle sensor 112.

Hereinafter, the steering angle sensor 112 will be described with reference to FIGS. 3 and 4.

First, as illustrated in FIG. 3, the steering angle sensor 112, an example of an angle sensor, is provided on the second end side (upper end side in FIG. 3) of the assistance unit-side pinion shaft 116 in the axial direction, which is opposite to the side on which the pinion 116a is formed in the assistance unit-side pinion shaft 116. More specifically, the steering angle sensor 112 is provided at a portion of the assistance unit-side pinion shaft 116, which is opposite to the connection portion between the assistance unit-side pinion shaft 116 and the rack shaft 105 in the axial direction of the assistance unit-side pinion shaft 116, with the worm wheel 124 interposed between the steering angle sensor 112 and the connection portion.

As illustrated in FIG. 4, the steering angle sensor 112 includes a first gear (rotator) 112a fixed to the assistance unit-side pinion shaft 116 by a well-known fixing method such as press fitting; a second gear 112b meshing with the first gear 112a; a third gear 112c meshing with the second gear 112b; and an angle detecting mechanism 112d detecting the rotational angle of the third gear 112c.

In the illustrated example, an engagement pin 116b provided on an outer circumferential surface of the assistance unit-side pinion shaft 116 in a protruding manner enters an engagement groove 112e provided in an inner circumferential surface of the first gear 112a such that the position of the first gear 112a with respect to the assistance unit-side pinion shaft 116 is fixed. The third gear 112c and the angle detecting mechanism 112d are an example of a detector.

A region 112f, in which the first gear 112a provided on the assistance unit-side pinion shaft 116 meshes with the second gear 112b, is disposed opposite to the rack guide 128 with a center axis CL of the assistance unit-side pinion shaft 116 interposed between the region 112f and the rack guide 128. As such, when the rack guide 128 presses the assistance unit-side pinion shaft 116, the first gear 112a more reliably meshes with the second gear 112b in the region 112f.

In the steering angle sensor 112 with such a configuration, the assistance unit-side pinion shaft 116 is rotated along with the rotation of the steering wheel 101 (refer to FIG. 1), and thus the first gear 112a to the third gear 112c are rotated. The rotational angle of the third gear 112c is detected by the well-known angle detecting mechanism 112d such that the angle of the assistance unit-side pinion shaft 116 is detected. The steering angle (absolute steering angle) of the steering wheel 101 (refer to FIG. 1) is detected based on the angle of the assistance unit-side pinion shaft 116.

The control apparatus 10 (refer to FIG. 1) detects (calculates) the steering angle of the steering wheel 101 (refer to FIG. 1) based on a ratio between the specific stroke (movement distance of the rack shaft 105 per one rotation of the assistance unit-side pinion shaft 116) of the assistance unit-side pinion shaft 116 and the specific stroke of the steering wheel-side pinion shaft 106.

Specifically, the steering angle of the steering wheel 101 (refer to FIG. 1) is obtained by multiplying this ratio by the rotational angle of the assistance unit-side pinion shaft 116. This obtained steering angle is an absolute steering angle which is the amount of rotation of the steering wheel 101 from a neutral position (reference position) of the steering wheel 101 when the front wheels 150 (refer to FIG. 1) are aligned in the forward-moving direction.

Additionally, since the steering wheel-side pinion shaft 106 and the assistance unit-side pinion shaft 116 have different speed reduction ratios, the steering angle of the steering wheel 101 may be calculated by performing computation based on the difference between the speed reduction ratios.

The steering angle (rotational angle) detected by the steering angle sensor 112 with the aforementioned configuration is sent to the control apparatus 10 (refer to FIG. 1). The control apparatus 10 having received a signal for the steering angle controls the position of the vehicle on the basis of the calculated steering angle.

Technology in the related art different from the embodiment may have a configuration (hereinafter, referred to as a "configuration in the related art") in which the steering angle sensor 112 is provided on the steering shaft 102 (refer to FIG. 1). Hereinafter, the points of difference between the configuration of the embodiment and the configuration in the related art will be described.

Unlike the configuration in the related art, in the configuration of the embodiment, a sensor detecting the rotational angle of the steering wheel 101 is not provided between the steering wheel 101 and the steering wheel-side rack teeth 105a. In other words, in the configuration of the embodiment, none of the steering shaft 102, the universal coupling 103a, the upper connecting shaft 103, the universal coupling 103b, the lower connecting shaft 108, the torsion bar 114, and the steering wheel-side pinion shaft 106 includes a sensor detecting the rotational angle. In the configuration of the embodiment, it is possible to suppress the transmission of resistance, which is caused by the rotation of the first gear 112a to the third gear 112c of the steering angle sensor 112, to the steering shaft 102 (refer to FIG. 1), that is, to suppress the transmission of friction of the steering angle sensor 112 to the steering shaft 102. Accordingly, steering feeling in the configuration of the embodiment is better than in the configuration in the related art.

In the configuration of the embodiment, the distance between the position, in which the steering angle sensor 112 is provided, and the rack shaft 105 is short compared to the configuration in the related art. In other words, in the configuration of the embodiment, the number of members interposed between the position, in which the steering angle sensor 112 is provided, and the rack shaft 105 is small compared to the configuration in the related art. Accordingly, the steering angle sensor 112 more accurately detects the position of the rack shaft 105.

More specifically, in the embodiment, the assistance unit-side pinion shaft 116 is present as a single member between the position, in which the steering angle sensor 112 is provided, and the rack shaft 105. In contrast, in the configuration in the related art, multiple members (the steering shaft 102, the universal coupling 103a, the upper connecting shaft 103, the universal coupling 103b, the lower connecting shaft 108, the torsion bar 114, and the steering wheel-side pinion shaft 106) are present therebetween.

When the steering angle sensor 112 is assumed to be provided on the steering shaft 102 as an example of the configuration in the related art, the steering angle sensor 112 is connected to the rack shaft 105 via the torsion bar 114 which is prone to twisting. Accordingly, the torsion bar 114 may be twisted such that accuracy in detecting the position of the rack shaft 105 is decreased.

Accuracy in detecting the position of the rack shaft 105 may be decreased due to affects of backlash among the members such as the steering shaft 102, the universal coupling 103a, the upper connecting shaft 103, the universal coupling 103b, the lower connecting shaft 108, the torsion bar 114, and the steering wheel-side pinion shaft 106.

Accordingly, in the configuration of the embodiment in which there are no factors causing a decrease in the detection accuracy, accuracy in detecting the position of the rack shaft 105 is high compared to the configuration in the related art.

In the embodiment, the steering angle sensor 112 is also capable of serving as a rotation angle sensor (resolver) of the electric motor 110. In the configuration of the embodiment, the number of members interposed between the position, in which the steering angle sensor 112 is provided, and the electric motor 110 is small compared to the configuration in the related art.

Accordingly, when the steering angle sensor 112 detects (obtains) the rotational angle of the electric motor 110, detection accuracy is high compared to the configuration in the related art (errors are decreased). An independent sensor for detecting the rotational angle of the electric motor 110 may not be provided in the electric motor 110. Alternatively, when a rotation angle sensor is built into the electric motor 110, the steering angle sensor 112 may be used as a backup sensor when the built-in rotation angle sensor is faulty.

The steering angle sensor 112 is provided closer to a first end portion of the assistance unit-side pinion shaft 116 than a member (the worm wheel 124 in the illustrated example) that is disposed closest to the first end portion among the members mounted on the assistance unit-side pinion shaft 116. The steering angle sensor 112 mounted on the assistance unit-side pinion shaft 116 is positioned to face the third member 20f. Accordingly, since the steering angle sensor 112 is exposed by removing the third member 20f from the assistance unit 120 to perform maintenance and inspection of the steering angle sensor 112, ease of maintenance and inspection of the steering angle sensor 112 is improved.

In the configuration of the embodiment, the degree of freedom in securing a space in the vicinity of the steering wheel 101 is increased compared to the configuration in the related art. As described with reference to FIG. 2, in the illustrated example, the steering wheel-side accommodating portion 20b and the assistance unit-side accommodating portion 20c are disposed at different positions in the longitudinal direction and the circumferential direction. Accordingly, the degree of freedom in securing a space in the vicinity of the steering wheel 101 is increased compared to when such a disposition is not adopted.

In the configuration of the embodiment, when the control apparatus 10 is provided closer to the assistance unit-side accommodating portion 20c than the steering wheel-side accommodating portion 20b, the length of wiring from the steering angle sensor 112 to the control apparatus 10 can be reduced.

Modification Examples

FIGS. 5A and 5C are views illustrating modification examples of the mounting position of the steering angle sensor 112. In the following description, the same reference signs are assigned to the same portions as those of the assistance unit 120 illustrated in FIG. 3, and detailed description thereof will be omitted.

In the aforementioned description given with reference to FIG. 3, the steering angle sensor 112 is provided on the second end side (upper end side in FIG. 3) of the assistance unit-side pinion shaft 116, which is opposite to the side on which the pinion 116a is formed in the assistance unit-side pinion shaft 116. The mounting position of the steering angle sensor 112 is not limited to the second end side insofar as the steering angle sensor 112 can be provided on the assistance unit-side pinion shaft 116.

For example, as in the configuration illustrated in FIG. 5A, a steering angle sensor 1121 may be provided between the second bearing 133b and the rack shaft 105 in an axial direction of an assistance unit-side pinion shaft 1161.

Alternatively, as in the configuration illustrated in FIG. 5B, a steering angle sensor 1122 may be provided between the rack shaft 105 and the first bearing 133a in an axial direction of an assistance unit-side pinion shaft 1162.

When the steering angle sensors 1121 and 1122 are disposed closely to the rack shaft 105 as illustrated in FIGS. 5A and 5B, the steering angle sensors 1121 and 1122 are capable of detecting the position of the rack shaft 105 with improved accuracy.

As in the configuration illustrated in FIG. 5C, a steering angle sensor 1123 may be provided at a portion of an assistance unit-side pinion shaft 1163 in the axial direction, which is opposite to the rack shaft 105 with the first bearing 133a interposed between the steering angle sensor 1123 and the rack shaft 105. When such a disposition is adopted, the degree of freedom in securing a space in the vicinity of the rack shaft 105 is increased with the first bearing 133a interposed between the steering angle sensor 1123 and the rack shaft 105.

In the aforementioned description given with reference to FIG. 4, the steering angle sensor 112 measures the rotational angle of the assistance unit-side pinion shaft 116 via the members (the first gear 112a to the third gear 112c) in physical contact with the assistance unit-side pinion shaft 116; however, the present invention is not limited to that configuration. For example, the steering angle sensor 112 may be configured to include a gear portion (not illustrated) formed in the outer circumferential surface of the assistance unit-side pinion shaft 116, and a rotator (not illustrated) which is rotated meshing with the gear portion. The steering angle sensor 112 may be configured to detect the rotational angle by detecting relative angles between multiple magnetic yokes and a magnet, in other words, may be configured to detect the rotational angle in a contactless manner.

The embodiment and the modification examples of various forms have been described, and combinations of the embodiment and the modification examples may be adopted.

This disclosure is not limited to the embodiment, and can be realized in various forms insofar as the forms do not depart from the purport of this disclosure.

What is claimed is:

1. A power steering apparatus comprising:
   a rack shaft that comprises a rack, and moves a steered unit;
   a first pinion shaft that comprises a first pinion meshing with the rack of the rack shaft, and is rotated along with steering of a steering unit;
   a second pinion shaft that comprises a second pinion meshing with the rack of the rack shaft, and is driven by a drive unit to rotate so as to assist the rotation of the first pinion shaft; and
   an angle sensor that is provided on the second pinion shaft, and detects a rotational angle of the second pinion shaft.

2. The power steering apparatus according to claim 1, wherein the angle sensor is provided at a portion of the second pinion shaft, which is opposite to the second pinion in an axial direction of the second pinion shaft while a driven portion of the second pinion shaft which receives a driving force by the drive unit is interposed between the angle sensor and the second pinion.

3. The power steering apparatus according to claim 1, wherein the second pinion shaft is supported by a first bearing and a second bearing which are respectively provided at both sides of the second pinion shaft so that a driven portion of the second pinion shaft which receives a driving force by the drive unit is positioned between the first bearing and the second bearing in an axial direction of the second pinion shaft, and
   wherein the angle sensor is provided between the first bearing and the second bearing in the axial direction of the second pinion shaft.

4. The power steering apparatus according to claim 1, wherein the angle sensor is provided at same side of the second pinion shaft as the second pinion, with respect to a driven portion of the second pinion shaft which receives a driving force by the drive unit, in an axial direction of the second pinion shaft.

5. The power steering apparatus according to claim 2, further comprising:
   a housing that comprises: a body accommodating the second pinion shaft and having an opening at a side of an end portion of the second pinion shaft opposite to the second pinion of the second pinion shaft; and a covering member covering the opening of the body.

6. The power steering apparatus according to claim 3, further comprising:
   a housing that comprises: a body accommodating the second pinion shaft and having an opening at a side of an end portion of the second pinion shaft opposite to the second pinion of the second pinion shaft; and a covering member covering the opening of the body.

7. The power steering apparatus according to claim 4, further comprising:
   a housing that comprises: a body accommodating the second pinion shaft and having an opening at a side of an end portion of the second pinion shaft opposite to the second pinion of the second pinion shaft; and a covering member covering the opening of the body.

8. The power steering apparatus according to claim 1, wherein a sensor detecting a rotational angle of the steering unit is not provided between the steering unit and the first pinion.

9. The power steering apparatus according to claim 2, wherein a sensor detecting a rotational angle of the steering unit is not provided between the steering unit and the first pinion.

10. The power steering apparatus according to claim 3, wherein a sensor detecting a rotational angle of the steering unit is not provided between the steering unit and the first pinion.

11. The power steering apparatus according to claim 4, wherein a sensor detecting a rotational angle of the steering unit is not provided between the steering unit and the first pinion.

12. The power steering apparatus according to claim 5, wherein a sensor detecting a rotational angle of the steering unit is not provided between the steering unit and the first pinion.

13. The power steering apparatus according to claim 6, wherein a sensor detecting a rotational angle of the steering unit is not provided between the steering unit and the first pinion.

14. The power steering apparatus according to claim 1, wherein the angle sensor comprises a gear rotating together with the second pinion, and a detection unit meshing with the gear and detecting the rotation of the gear.

15. The power steering apparatus according to claim 2, wherein the angle sensor comprises a gear rotating together with the second pinion, and a detection unit meshing with the gear and detecting the rotation of the gear.

16. The power steering apparatus according to claim 3, wherein the angle sensor comprises a gear rotating together with the second pinion, and a detection unit meshing with the gear and detecting the rotation of the gear.

17. The power steering apparatus according to claim 4, wherein the angle sensor comprises a gear rotating together with the second pinion, and a detection unit meshing with the gear and detecting the rotation of the gear.

18. The power steering apparatus according to claim 5, wherein the angle sensor comprises a gear rotating together with the second pinion, and a detection unit meshing with the gear and detecting the rotation of the gear.

19. The power steering apparatus according to claim 6, wherein the angle sensor comprises a gear rotating together with the second pinion, and a detection unit meshing with the gear and detecting the rotation of the gear.

20. A power steering apparatus comprising:

a rack shaft that comprises a rack, and moves a steered unit;

a first pinion shaft that comprises a first pinion meshing with the rack of the rack shaft, and is rotated along with steering of a steering unit;

a second pinion shaft that comprises a second pinion meshing with the rack of the rack shaft, and a driven portion which receives a driving force by a drive unit;

a rotator that is provided at a portion of the second pinion shaft, which is opposite to the second pinion, with the driven portion interposed between the rotator and the second pinion, and is rotated together with the second pinion shaft; and a detector that is rotated meshing with the rotator, and detects a rotational angle of the rotator.

* * * * *